US008896673B2

(12) United States Patent
Liu et al.

(10) Patent No.: US 8,896,673 B2
(45) Date of Patent: Nov. 25, 2014

(54) METHOD, TV SET FOR DISPLAYING 3D IMAGE AND GLASSES

(75) Inventors: Weidong Liu, Qingdao (CN); Weisong Gao, Qingdao (CN); Chunpu Li, Qingdao (CN); Junhui Shang, Qingdao (CN); Yuzhen Dong, Qingdao (CN); Yongping Miao, Qingdao (CN)

(73) Assignees: Hisense Electric Co., Ltd., Qingdao, Shandong (CN); Hisense Hiview Tech Co., Ltd., Qingdao, Shandong (CN)

( * ) Notice: Subject to any disclaimer, the term of this patent is extended or adjusted under 35 U.S.C. 154(b) by 142 days.

(21) Appl. No.: 13/386,002

(22) PCT Filed: Feb. 22, 2010

(86) PCT No.: PCT/CN2010/070705
§ 371 (c)(1),
(2), (4) Date: Jan. 19, 2012

(87) PCT Pub. No.: WO2011/029293
PCT Pub. Date: Mar. 17, 2011

(65) Prior Publication Data
US 2012/0120206 A1 May 17, 2012

(30) Foreign Application Priority Data

Sep. 11, 2009 (CN) .......................... 2009 1 0170876

(51) Int. Cl.
*H04N 13/00* (2006.01)
*H04N 15/00* (2006.01)
(Continued)

(52) U.S. Cl.
CPC ......... *H04N 13/0497* (2013.01); *G09G 3/3406* (2013.01); *G02B 27/2264* (2013.01);
(Continued)

(58) Field of Classification Search
None
See application file for complete search history.

(56) References Cited

U.S. PATENT DOCUMENTS 6,314,248 B1 * 11/2001 Ohmura et al. ............... 396/429
(Continued)

FOREIGN PATENT DOCUMENTS

CN 1083299 A 3/1994
(Continued)

OTHER PUBLICATIONS

"Video Frame Rate vs Screen Refresh Rate Understanding Video Frame Rates and Screen Refresh Rates" Silva, Robert. Accessed May 9, 2014. http://hometheater.about.com/od/televisionbasics/qt/framevsrefresh.htm.*
(Continued)

*Primary Examiner* — Joseph Ustaris
*Assistant Examiner* — Kevin McInnish
(74) *Attorney, Agent, or Firm* — Buchanan Ingersoll & Rooney

(57) ABSTRACT

A method for displaying 3D image is provided in the present invention. The method includes: 3D image signals, which comprise consecutive one frame of left-eye signal and one frame of right-eye signal, are received; the 3D image signals are processed by frequency multiplication, and n consecutive frames of left-eye signals and n consecutive frames of right-eye signals are obtained, n being the times number of the frequency multiplication and equal to or greater than 2; light-emitting diode (LED) driving signals drive the LED to display the n consecutive frames of left-eye signals and the n consecutive frames of right-eye signals; in the n consecutive frames of left-eye signals, the first frame of left-eye signal corresponds to an LED driving signal which is off, the nth frame of left-eye signal corresponds to an LED driving signal which is on, and in the n consecutive frames of right-eye signals, the first frame of right-eye signal corresponds to an LED driving signal which is off, the nth frame of right-eye signal corresponds to an LED driving signal which is on. The present invention also provides a TV set for displaying 3D image and a pair of glasses for viewing 3D image. By the present invention, the problem of crosstalk between leftimage and rightimage is solved, and backlight sources energy consumption and complete apparatus cost are reduced.

10 Claims, 6 Drawing Sheets

(51) Int. Cl.
*H04N 13/04* (2006.01)
*H04N 9/47* (2006.01)
*G09G 3/34* (2006.01)
*G02B 27/22* (2006.01)
*G09G 3/00* (2006.01)

(52) U.S. Cl.
CPC .......... *G09G 2330/021* (2013.01); *G09G 3/003* (2013.01); *G09G 2310/08* (2013.01); *G09G 2340/0435* (2013.01); *H04N 13/0438* (2013.01)
USPC ................... 348/51; 348/42; 348/54; 348/56

(56) References Cited

U.S. PATENT DOCUMENTS

| | | | |
|---|---|---|---|
| 7,002,619 | B1 | 2/2006 | Dean et al. |
| 2007/0085902 | A1* | 4/2007 | Walker et al. .................... 348/51 |
| 2007/0242068 | A1 | 10/2007 | Han et al. |
| 2008/0030634 | A1 | 2/2008 | Aramatsu |
| 2008/0036696 | A1 | 2/2008 | Slavenburg et al. |
| 2010/0066820 | A1* | 3/2010 | Park et al. ........................ 348/53 |
| 2010/0097449 | A1* | 4/2010 | Jeong et al. ..................... 348/59 |
| 2010/0208043 | A1 | 8/2010 | Hoffman |
| 2010/0238274 | A1 | 9/2010 | Kim et al. |
| 2012/0224036 | A1* | 9/2012 | Marcus et al. .................. 348/54 |

FOREIGN PATENT DOCUMENTS

| | | |
|---|---|---|
| CN | 1181819 A | 5/1998 |
| CN | 1300038 A | 6/2001 |
| CN | 2519920 Y | 11/2002 |
| CN | 101013201 A | 8/2007 |
| CN | 101123734 A | 2/2008 |
| CN | 101123736 A | 2/2008 |
| CN | 101313595 A | 11/2008 |
| CN | 101415126 A | 4/2009 |
| CN | 101697595 A | 4/2010 |
| EP | 2 228 998 A2 | 9/2010 |
| EP | 2 327 228 A2 | 6/2011 |
| EP | 2 409 495 A2 | 1/2012 |
| JP | 2009 025436 A | 2/2009 |
| WO | WO 2009 051603 A1 | 4/2009 |
| WO | WO2010/032927 | 3/2010 |
| WO | WO2010/107227 | 9/2010 |

OTHER PUBLICATIONS

International Search Report (PCT/ISA/210) issued on Jun. 17, 2010, by Chinese Patent Office as the International Searching Authority for International Application No. PCT/CN2010/070705.

Written Opinion (PCT/ISA/237) issued on Jun. 17, 2010, by Chinese Patent Office as the International Searching Authority for International Application No. PCT/CN2010/070705.

Supplementary European Search Report issued Mar. 13, 2013, in corresponding European Patent Application No. 10814895.8.

Suzuki, D. et al., 31.2 "Crosstalk-Free 3D Display with Time-Sequential OCB LCD," SID 09 Digest, pp. 428-431.

* cited by examiner

METHOD, TV SET FOR DISPLAYING 3D IMAGE AND GLASSES

This application is a national stage application of PCT/CN2010/070705 filed on Feb. 22, 2010, which claims the benefit of Chinese patent application No. 200910170876.X titled "Method and Television Set for Displaying 3D (Three dimension) Video and Glasses" and filed with the State Intellectual Property Office on Sep. 11, 2009. Both the international application and the Chinese application are incorporated herein by reference in their entireties.

FIELD OF THE INVENTION

The present invention relates to the field of three-dimensional technologies, and in more particular to a method and a television set for displaying a 3d video as well as glasses.

BACKGROUND OF THE INVENTION

The principle of 3D display technologies is to use optical or circuit processing to present two slightly offset images to the left and right eye respectively, without mutual interference. Both of the offset images are then combined in the cerebral cortex to give the perception of 3D. Many methods are available for displaying 3d videos on a Liquid Crystal Display (LCD) television, including a glasses type and a naked-eye type.

The naked-eye type uses a 3D grating attached to the surface of the LCD screen, which enables left-eye/right-eye separation by refraction or blocking. For more information please refer to Chinese patent application CN101013201A. Disadvantages of the referring method include low resolution, and high cost of the 3D grating.

A polarization-based glasses type uses a polarizing retarder attached to the surface of the LCD screen, which separates the left-eye image and the right-eye image by controlling the direction of polarization. For more information please refer to Chinese patent application CN200680033140.2. Disadvantages of the polarization-based method include high processing difficulty of the polarizing retarder, high cost and complex technology requirements of film attachment.

SUMMARY OF THE INVENTION

The present invention provides a method and a television set for displaying a 3d video as well as glasses, to solve the problem of crosstalk between the left-eye image and the right-eye image for LCD displays and to lower the overall implementation cost.

According to an embodiment of the present invention, it is provided a method for displaying a 3d video, including:

receiving a 3d video signal, the 3d video signal including a frame of a left-eye signal and a frame of a right-eye signal that are consecutive;

performing frequency multiplication on the 3d video signal, to obtain n consecutive frames of the left-eye signal and n consecutive frames of the right-eye signal, with n being the number by which a frequency is multiplied and equal to or greater than 2; and driving, by light-emitting diode (LED) driving signals, a panel to display the n consecutive frames of the left-eye signal and the n consecutive frames of the right-eye signal, wherein among the n consecutive frames of the left-eye signal, the first frame of the left-eye signal corresponds to an LED driving signal which is off, and the nth frame of the left-eye signal corresponds to an LED driving signal which is on; and, among the n consecutive frames of the right-eye signal, the first frame of the right-eye signal corresponds to an LED driving signal which is off, and the nth frame of the right-eye signal corresponds to an LED driving signal which is on.

Preferably, among the n consecutive frames of the left-eye signal, the second to the (n−1)th frames of the left-eye signal correspond to LED driving signals which are on or off; and, among the n consecutive frames of the right-eye signal, the second to the (n−1)th frames of the right-eye signal correspond to LED driving signals which are on or off.

Preferably, the method further includes: extracting a synchronized control signal from the 3d video signal; and, according to the synchronized control signal, controlling the LED driving signals and sending a lens on/off signal to glasses for viewing the 3d video signal, which controls a right-eye lens to be turned on and a left-eye lens to be turned off, or controls the right-eye lens to be turned off and the left-eye lens to be turned on, wherein when the right-eye lens is turned on and the left-eye lens is turned off, the LED driving signals drive a panel to display the n consecutive frames of the right-eye video signal; and, when the right-eye lens is controlled to be turned off and the left-eye lens is controlled to be turned on, the LED driving signals drive the panel to display the n consecutive frames of the left-eye video signal.

According to an embodiments of the present invention, it is also provided a method for displaying a 3d video, including:

receiving a 3d video signals, the 3d video signal including a frame of a left-eye signal and a frame of a right-eye signal;

inserting a black frame to the 3d video signal, and performing frequency multiplication on the 3d video signal, to generate n consecutive frames of the left-eye signal and n consecutive frames of the right-eye signal including the black frame, with n being the number by which a frequency is multiplied and equal to or greater than 2, wherein among the n consecutive frames of the left-eye signal, the first frame of the left-eye signal is a black frame, and the nth frame of the left-eye signal is a non-black frame; and, among the n consecutive frames of the right-eye signal, the first frame of the right-eye signal is a black frame, and the nth frame of the right-eye signal is a non-black frame; and driving, by light-emitting diode (LED) driving signals, a panel to display the n consecutive frames of the left-eye signal and the n consecutive frames of the right-eye signal.

Preferably, among the n consecutive frames of the left-eye signal, the second to the (n−1)th frames of the left-eye signal correspond to black frames or non-black frames; and, among the n consecutive frames of the right-eye signal, the second to the (n−1)th frames of the right-eye signal correspond to black frames or non-black frames.

Preferably, the method further includes: extracting a synchronized control signal from the 3d video signal; and, according to the synchronized control signal, controlling the LED driving signals and sending a lens on/off signal to glasses for viewing the 3d video signal, which controls a right-eye lens to be turned on and a left-eye lens to be turned off, or controls the right-eye lens to be turned off and the left-eye lens to be turned on, wherein when the right-eye lens is controlled to be turned on and the left-eye lens is controlled to be turned off, the LED driving signals drive a panel to display the n consecutive frames of the right-eye video signal; and, when the right-eye lens is controlled to be turned off and the left-eye lens is controlled to be turned on, the LED driving signals drive the panel to display the n consecutive frames of the left-eye video signal.

Preferably, the method further includes:

according to the synchronized control signal, controlling LED driving signals corresponding to the black frames among the n consecutive frames of the left-eye signal to be off, and LED driving signals corresponding to the non-black frames to be on; and controlling LED driving signals corresponding to the black frames among the n consecutive frames of the right-eye signal to be off, and LED driving signals corresponding to the non-black frames to be on.

According to an embodiments of the present invention, it is also provided a television set for displaying a 3d video, including:

a processing board, adapted to receive a 3d video signal, the 3d video signal including a frame of a left-eye signal and a frame of a right-eye signal that are consecutive; and perform frequency multiplication on the 3d video signal, to obtain n consecutive frames of the left-eye signal and n consecutive frames of the right-eye signal, with n being the number by which a frequency is multiplied and equal to or greater than 2; and an LED driving module, adapted to send LED driving signals for driving a panel to display the n consecutive frames of the left-eye signal and the n consecutive frames of the right-eye signal, wherein among the n consecutive frames of the left-eye signal, the first frame of the left-eye signal corresponds to an LED driving signal which is off, and the nth frame of the left-eye signal corresponds to an LED driving signal which is on; and, among the n consecutive frames of the right-eye signal, the first frame of the right-eye signal corresponds to an LED driving signal which is off, and the nth frame of the right-eye signal corresponds to an LED driving signal which is on.

Preferably, among the n consecutive frames of the left-eye signal, the second to the (n−1)th frames of the left-eye signal correspond to LED driving signals which are on or off; and, among the n consecutive frames of the right-eye signal, the second to the (n−1)th frames of the right-eye signal correspond to LED driving signals which are on or off.

Preferably, the processing board is further adapted to extract a synchronized control signal from the 3d video signal and send the synchronized control signal to a liquid crystal panel driving board and a glasses on/off module;

the LED driving module is further adapted to control the LED driving signals according to the synchronized control signal; and the glasses on/off module is further adapted to send a lens on/off signal to glasses for viewing the 3d video signal according to the synchronized control signal, which controls a right-eye lens to be turned on and a left-eye lens to be turned off, or controls the right-eye lens to be turned off and the left-eye lens to be turned on, wherein when the right-eye lens is controlled to be turned on and the left-eye lens is controlled to be turned off, the LED driving signals drive a panel to display the n consecutive frames of the right-eye video signal; and, when the right-eye lens is controlled to be turned off and the left-eye lens is controlled to be turned on, the LED driving signals drive the panel to display the n consecutive frames of the left-eye video signal.

According to an embodiment of the present invention, it is further provided a television set for displaying a 3d video, including:

a processing board, adapted to receive a 3d video signal, the 3d video signal including a frame of a left-eye signal and a frame of a right-eye signal; insert a black frame to the 3d video signal, and perform frequency multiplication on the 3d video signal, to generate n consecutive frames of the left-eye signal and n consecutive frames of the right-eye signal including the black frame, with n being the number by which a frequency is multiplied and equal to or greater than 2, wherein among the n consecutive frames of the left-eye signal, the first frame of the left-eye signal is a black frame, and the nth frame of the left-eye signal is a non-black frame; and, among the n consecutive frames of the right-eye signal, the first frame of the right-eye signal is a black frame, and the nth frame of the right-eye signal is a non-black frame; and an LED driving module, adapted to send LED driving signals for driving a panel to display the n consecutive frames of the left-eye signal and the n consecutive frames of the right-eye signal.

Preferably, among the n consecutive frames of the left-eye signal, the second to the (n−1)th frames of the left-eye signal correspond to black frames or non-black frames; and, among the n consecutive frames of the right-eye signal, the second to the (n−1)th frames of the right-eye signal correspond to black frames or non-black frames.

Preferably, the processing board is further adapted to extract a synchronized control signal from the 3d video signal; and send the synchronized control signal to a liquid crystal panel driving board and a glasses on/off module;

the LED driving module is further adapted to control the LED driving signals according to the synchronized control signal; and the glasses on/off module is further adapted to send a lens on/off signal to glasses for viewing the 3d video signals according to the synchronized control signal, which controls a right-eye lens to be turned on and a left-eye lens to be turned off, or controls the right-eye lens to be turned off and the left-eye lens to be turned on, wherein when the right-eye lens is controlled to be turned on and the left-eye lens is controlled to be turned off, the LED driving signals drive a panel to display the n consecutive frames of the right-eye video signal; and, when the right-eye lens is controlled to be turned off and the left-eye lens is controlled to be turned on, the LED driving signals drive the panel to display the n consecutive frames of the left-eye video signal.

Preferably, the LED driving module is further adapted to, according to the synchronized control signal, control LED driving signals corresponding to the black frames among the n consecutive frames of the left-eye signal to be off, and LED driving signals corresponding to the non-black frames to be on; and control LED driving signals corresponding to the black frames among the n consecutive frames of the right-eye signal to be off, and LED driving signals corresponding to the non-black frames to be on.

According to an embodiment of the present invention, it is also provided glasses for viewing a 3d video, including:

a receiving module, adapted to receive a lens on/off signal and transmit the lens on/off signal to a controlling module; and a controlling module, adapted to, according to the received lens on/off signal, control a right-eye lens to be turned on and a left-eye lens to be turned off, or control the right-eye lens to be turned off and the left-eye lens to be turned on.

As compared with the prior art, the present invention may bring the following advantages.

In one aspect, the problem of crosstalk between the left-eye image and the right-eye image is solved. Persistence of the last image in the current image due to the displaying mechanism of LCDs is unacceptable for 3D display, because the resulted crosstalk between the left-eye image and the right-eye image can significantly degrade the perception of 3D, or even make it impossible. The embodiments of the present invention can solve this problem. When the frame with crosstalk is displayed, which does have a content, yet nothing is shown except a black frame because the backlight is off; hence, the crosstalk is eliminated.

In another aspect, power consumption of the backlight source is reduced. According to an embodiment of the present invention, power consumption is nearly zero during the off period of the LED source. The LED control signal has a duty cycle of 50%, reducing the power consumption by nearly 50%.

In yet another aspect, the overall cost is low. As compared with other 3D display solutions, the embodiments of the present invention do not require expensive optical screens or optical retarders, thus simplifying the technology and largely lowering the overall cost.

BRIEF DESCRIPTION OF THE DRAWINGS

For a better understanding of the technical solutions of the embodiments of the present invention, accompanying drawings used in the descriptions of the embodiments are described below. As a matter of course, the accompanying drawings described below are only some of the embodiments of the present invention, and other drawings may be obtained by those skilled in the art without inventive efforts based on these drawings.

DETAILED DESCRIPTION OF THE INVENTION

The technical solutions in the embodiments of the present invention will be described in detail hereinafter in conjunction with the accompanying drawings of the embodiments of the present invention. As a matter of course, the described embodiments are only some of the embodiments of the present invention instead of all the embodiments. Any other embodiment obtained by those skilled in the art based on the embodiments disclosed herein without inventive efforts shall fall within the scope of protection of the present invention.

Figure 1A:
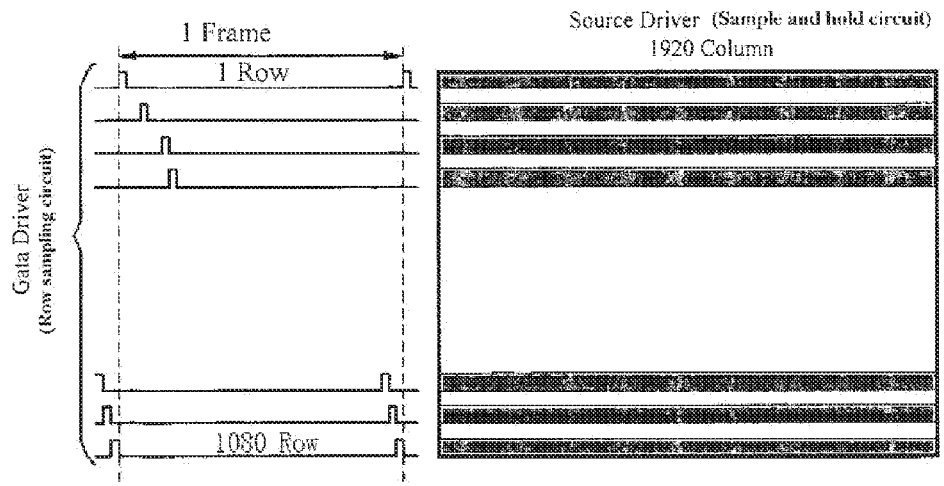
FIG. 1 illustrates a schematic diagram of the principle of liquid crystal display.
Figure 1B:
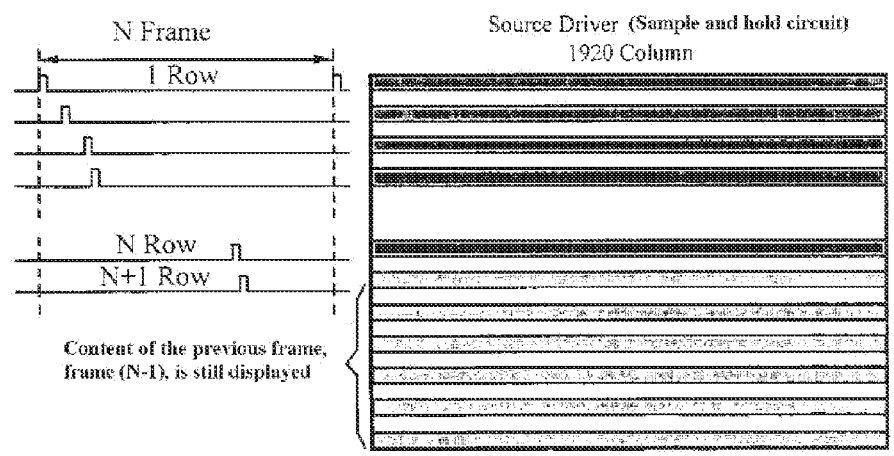

FIG. 1 is a schematic diagram of the principle of liquid crystal display. Each frame of the video consists of multiple rows, and is driven row by row. In FIG. 1a and FIG. 1b, the principle of liquid crystal display and driving is illustrated with an example of a 1920*1080 screen. The liquid crystal has a property of maintaining its brightness, i.e., when a nth row has been driven, the brightness will stay until a new driving signal is introduced. Therefore, in displaying two consecutive frames of the video, e.g., a nth frame and a (n+1)th frame, part of the content in the (n+1)th frame belongs to the nth frame. In displaying a 3D content, the difference between two consecutive frames that are presented to the left and the right eye respectively is slight. Hence, the property of maintaining the brightness may bring crosstalk between the contents for the left and the right eye, making the perception of 3D impossible.

Figure 2:
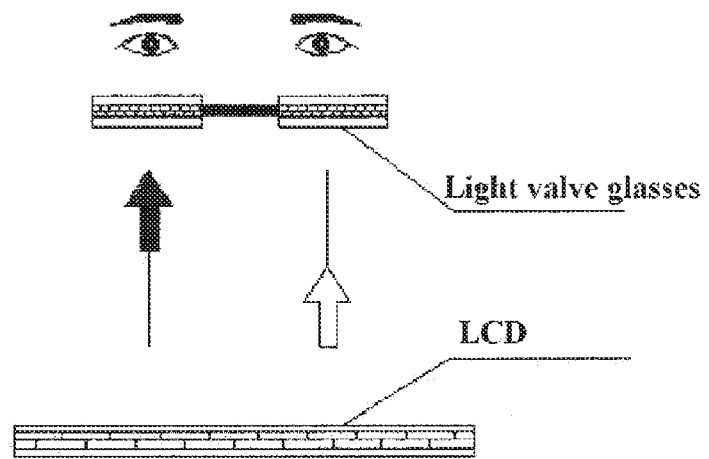
FIG. 2 illustrates the principle of a time multiplexing glasses type 3D display technology.

An embodiment of the present invention uses a time multiplexing method in the displaying of 3d videos, which belongs to the glasses type. The time multiplexing-based glasses type method includes alternately displaying a left-eye image and a right-eye image and transmiting them to the eyes according to a time sequence. As shown to FIG. 2, which illustrates the principle of the time multiplexing glasses type 3D display technology, the liquid crystal screen sends a left-eye video signal and a right-eye video signal sequentially as well as a sync signal. Upon receipt of the sync signal, light valve glasses control the left-eye lens and the right-eye lens to be turned on/off, so that the viewer's left eye and right eye receive the left-eye video signal and the right-eye video signal respectively.

Figure 3:
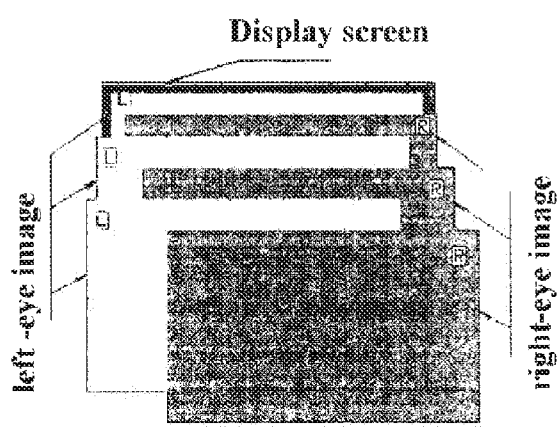
FIG. 3 illustrates a schematic diagram of a left-eye video signal and a right-eye video signal sent from a liquid crystal screen.

FIG. 3 illustrates a schematic diagram of a left-eye video signal and a right-eye video signal sent from a liquid crystal screen; hence, the left-eye video signal and right-eye video signal are sent alternately.

First Embodiment

Performing Frequency Multiplication on 3d Video Signal which is Time Multiplexed, and Controlling LED Backlight The method for displaying a 3d video according to the first embodiment includes: receiving a 3d video signal, the 3d video signal including a frame of a left-eye signal and a frame of a right-eye signal that are consecutive; performing frequency multiplication on the 3d video signal, to obtain n consecutive frames of the left-eye signal and n consecutive frames of the right-eye signal, with n being the number by which a frequency is multiplied and equal to or greater than 2; and driving, by light-emitting diode (LED) driving signals, a panel to display the n consecutive frames of the left-eye signal and the n consecutive frames of the right-eye signal, wherein among the n consecutive frames of the left-eye signal, the first frame of the left-eye signal corresponds to an LED driving signal which is off, and the nth frame of the left-eye signal corresponds to an LED driving signal which is on; and, among the n consecutive frames of the right-eye signal, the first frame of the right-eye signal corresponds to an LED driving signal which is off, and the nth frame of the right-eye signal corresponds to an LED driving signal which is on.

Among the n consecutive frames of the left-eye signal, the second to the (n−1)th frames of the left-eye signal correspond to LED driving signals which are on or off; and, among the n consecutive frames of the right-eye signal, the second to the (n−1)th frames of the right-eye signal correspond to LED driving signals which are on or off. That is, there is no strict limitations on the LED driving signals corresponding to the intermediate frames of the n consecutive frames of the left-eye signal and the n consecutive frames of the right-eye signal, and these LED driving signals may be set to be on or off according to actual needs.

Furthermore, a synchronized control signal may be extracted from the 3d video signal; and, according to the synchronized control signal, the LED driving signals may be controlled and sending a lens on/off signal to glasses for viewing the 3d video signal may be controlled, which controls a right-eye lens to be turned on and a left-eye lens to be turned off, or controls the right-eye lens to be turned off and the left-eye lens to be turned on. Specifically, when the right-eye lens is controlled to be turned on and the left-eye lens is controlled to be turned off, the LED driving signals drive a panel to display the n consecutive frames of the right-eye video signal; and, when the right-eye lens is controlled to be turned off and the left-eye lens is controlled to be turned on, the LED driving signals drive the panel to display the n consecutive frames of the left-eye video signal.

The sending the lens on/off signal to the glasses may be implemented via: infrared, radio frequency or bluetooth.

An implementation of the first embodiment will be described in detail hereinafter with an example where n equals 2.

Figure 4:
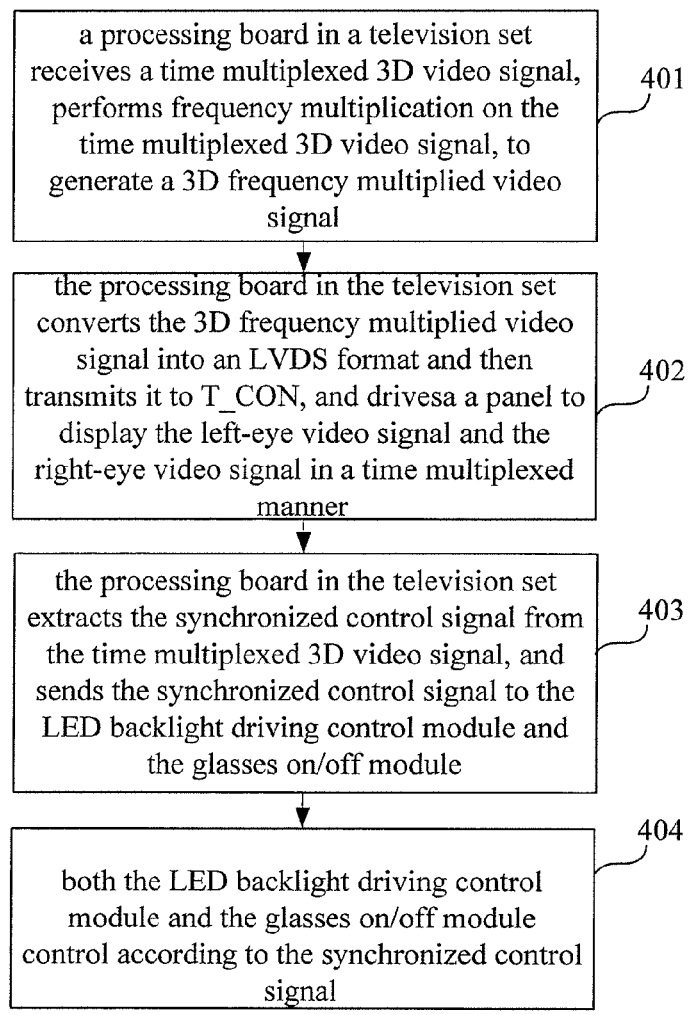
FIG. 4 illustrates a flow chart of a method for 3D display according to an embodiment of the present invention.

Referring to FIG. 4, which illustrates a flow chart of a method for 3D display according to an embodiment of the present invention, the flow chart includes the following steps.

Step 401, a processing board in a television set processes a received video signal into a time multiplexed 3d video signal, performs frequency multiplication on the time multiplexed 3d video signal, to generate a 3D frequency multiplied video signal;

where each frame of the time multiplexed 3d video signal corresponds to two frames of 3D frequency multiplied video signals having the same video content, and the time multiplexed 3d video signal includes a left-eye video signal and a right-eye video signal;

and the video signal received by the processing board in the television set may be a 3d video signal of any format.

Step 402, the processing board in the television set converts the 3D frequency multiplied video signal into a low-voltage differential signaling (LVDS) format and then transmits it to the liquid crystal panel driving board (T_CON), and drives the liquid crystal panel to display the left-eye video signal and the right-eye video signal in a time multiplexing manner.

Step 403, the processing board in the television set extracts the synchronized control signal from the time multiplexed 3d video signal, and sends the synchronized control signal to the LED backlight driving control module and the glasses on/off module.

Step 404, both the LED backlight driving control module and the glasses on/off module control according to the synchronized control signal, specifically:

the LED backlight driving control module controls, according to the synchronized control signal, an LED driving signal corresponding to one frame of the 3D frequency multiplied video signal having two frames with the same image content to be off, and the LED driving signal corresponding to the other frame to be on; and the glasses on/off module sends a lens on/off signal to the glasses according to the synchronized control signal, which controls the right-eye lens to be turned on and the left-eye lens to be turned off, or controls the right-eye lens to be turned off and the left-eye lens to be turned on.

When the right-eye lens is controlled to be turned on and the left-eye lens is controlled to be turned off, the liquid crystal panel is driven to display the two same frames of the right-eye video signal; and when the right-eye lens is controlled to be turned off and the left-eye lens is controlled to be turned on, the liquid crystal panel is driven to display the two same frames of the left-eye video signal.

It is noted that the glasses on/off module may send, according to the synchronized control signal, the lens on/off signal to the glasses via infrared, radio frequency, Bluetooth or the like.

The first embodiment will be described again hereinafter from the time sequence perspective.

Figure 5:
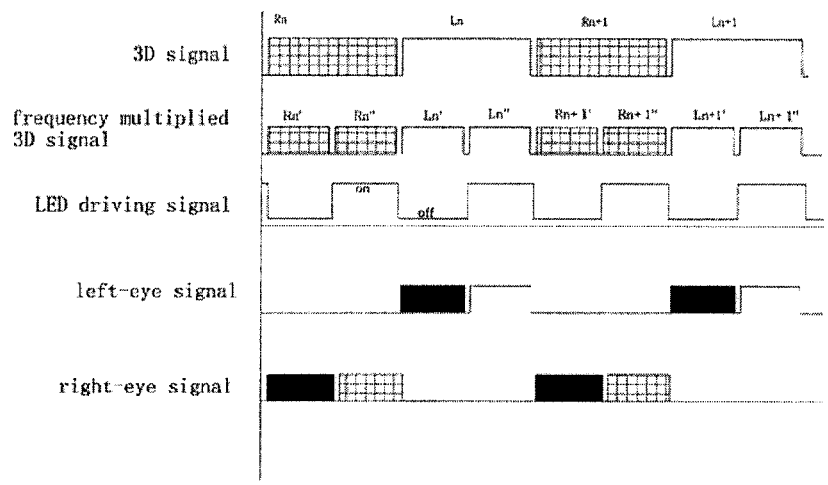
FIG. 5 illustrates a timing diagram of a time multiplexed 3d video signal, an LED driving signal and left-eye and right-eye signals according to a first embodiment of the present invention.

Reference is made to FIG. 5, which illustrates a timing diagram of a time multiplexed 3d video signal, an LED driving signal and left-eye and right-eye signals according to a first embodiment of the present invention. In FIG. 5, L and R represent the left-eye video signal and the right-eye video signal respectively.

The frequency multiplied 3d video signal (e.g., Rn", Rn', Ln", and Ln') as shown in FIG. 5 is formed by performing frequency multiplication on the time multiplexed 3d video signal (e.g., Rn and Ln), where the Ln" and the Ln' have the same content, the (Ln+1)" and the (Ln+1)' have the same content, the Rn" and the Rn' have the same content, and the (Rn+1)" and the (Rn+1)' have the same content. The LED driving signal is on in the Rn"th, the Ln"th, the (Rn+1)"th, and the (Ln+1)"th frames, and is off in the Rn'th, the Ln'th, the (Rn+1)'th, and the (Ln+1)'th frames. In the signal received by the left eye, the preceding part is the image content, and the latter part is dark because the LED backlight is off. The case with the signal received by the right eye is similar.

At the television set side, the LED backlight is controlled in such a way that the synchronized control signal from the time multiplexed 3d video signal, i.e., the frame sync signal, locks the time sequence control of the LED backlight, so that the LED backlight is on during the display of the Ln"th frame and the Rn"th frame, and is off during the display of the Ln'th frame and the Rn'th frame.

At the glasses side, when the Rn" th frame and the Rn'th frame are displayed, the right-eye lens is turned on and the left-eye lens is turned off under the control of the glasses on/off module; and when the Ln" th frame and the Ln'th frame are displayed, the left-eye lens is turned on and the right-eye lens is turned off under the control of the glasses on/off module. In this manner, under the control of the LED backlight and the cooperation of the glasses, the separation of the left-eye signal and the right-eye signal can be realized, giving the perception of 3D in the brain.

As compared with the prior art, the method for 3D display provided by the first embodiment of the present invention may bring at least the following advantages.

In one aspect, the problem of crosstalk between the left-eye image and the right-eye image is solved. Persistence of the last image in the current image due to the displaying mechanism of LCDs is unacceptable for 3D display, because the resulting crosstalk between the left-eye image and the right-eye image can significantly degrade the perception of 3D, or even make it impossible. The embodiments of the present invention can solve this problem. When the frame with crosstalk is displayed, which does have a content, yet nothing is shown except a black frame because the backlight is off; hence, the crosstalk is eliminated.

In another aspect, power consumption of the backlight source is reduced. According to an embodiment of the present invention, power consumption is nearly zero during the off period of the LED source. The LED control signal has a duty cycle of 50%, reducing the power consumption by nearly 50%.

In yet another aspect, the overall cost is low. As compared with other 3D display solutions, the embodiments of the present invention do not require expensive optical screens or optical retarders, thus simplifying the technology and largely lowering the overall cost.

Second Embodiment

Performing Frequency Multiplication on Time Multiplexed 3d Video Signal, and Inserting Black Frame The method for displaying 3d video according to the second embodiment includes: receiving a 3d video signals, the 3d video signal including a frame of a left-eye signal and a frame of a right-eye signal; inserting a black frame to the 3d video signal, and performing frequency multiplication on the 3d video signal, to generate n consecutive frames of the left-eye signal and n consecutive frames of the right-eye signal including the black frame, with n being the number by which a frequency is multiplied and equal to or greater than 2, wherein among the n consecutive frames of the left-eye signal, the first frame of the left-eye signal is a black frame, and the nth frame of the left-eye signal is a non-black frame; and, among the n consecutive frames of the right-eye signal, the first frame of the right-eye signal is a black frame, and the nth frame of the right-eye signal is a non-black frame; and driving, by light-emitting diode (LED) driving signals, a panel to display the n consecutive frames of the left-eye signal and the n consecutive frames of the right-eye signal.

Among the n consecutive frames of the left-eye signal, the second to the (n−1)th frames of the left-eye signal correspond to black frames or non-black frames; and, among the n consecutive frames of the right-eye signal, the second to the (n−1)th frames of the right-eye signal correspond to black frames or non-black frames. That is, there is no strict limitations on whether the intermediate frames of the n consecutive frames of the left-eye signal and the n consecutive frames of the right-eye signal are black frames, which may be set according to actual needs.

Furthermore, a synchronized control signal may be extracted from the 3d video signal; and, according to the synchronized control signal, the LED driving signals may be controlled and sending a lens on/off signal to glasses for viewing the 3d video signal may be controlled, which controls a right-eye lens to be turned on and a left-eye lens to be turned off, or controls the right-eye lens to be turned off and the left-eye lens to be turned on. Specifically, when the right-eye lens is controlled to be turned on and the left-eye lens is controlled to be turned off, the LED driving signals drive a panel to display the n consecutive frames of the right-eye video signal; and, when the right-eye lens is controlled to be turned off and the left-eye lens is controlled to be turned on, the LED driving signals drive the panel to display the n consecutive frames of the left-eye video signal.

The method above may further include: according to the synchronized control signal, controlling LED driving signals corresponding to the black frames among the n consecutive frames of the left-eye signal to be off, and LED driving signals corresponding to the non-black frames to be on; and controlling LED driving signals corresponding to the black frames among the n consecutive frames of the right-eye signal to be off, and LED driving signals corresponding to the non-black frames to be on.

The sending the lens on/off signal to the glasses may be implemented via: infrared, radio frequency or bluetooth.

An implementation of the second embodiment will be described in detail hereinafter with an example where n equals 2.

Figure 6:
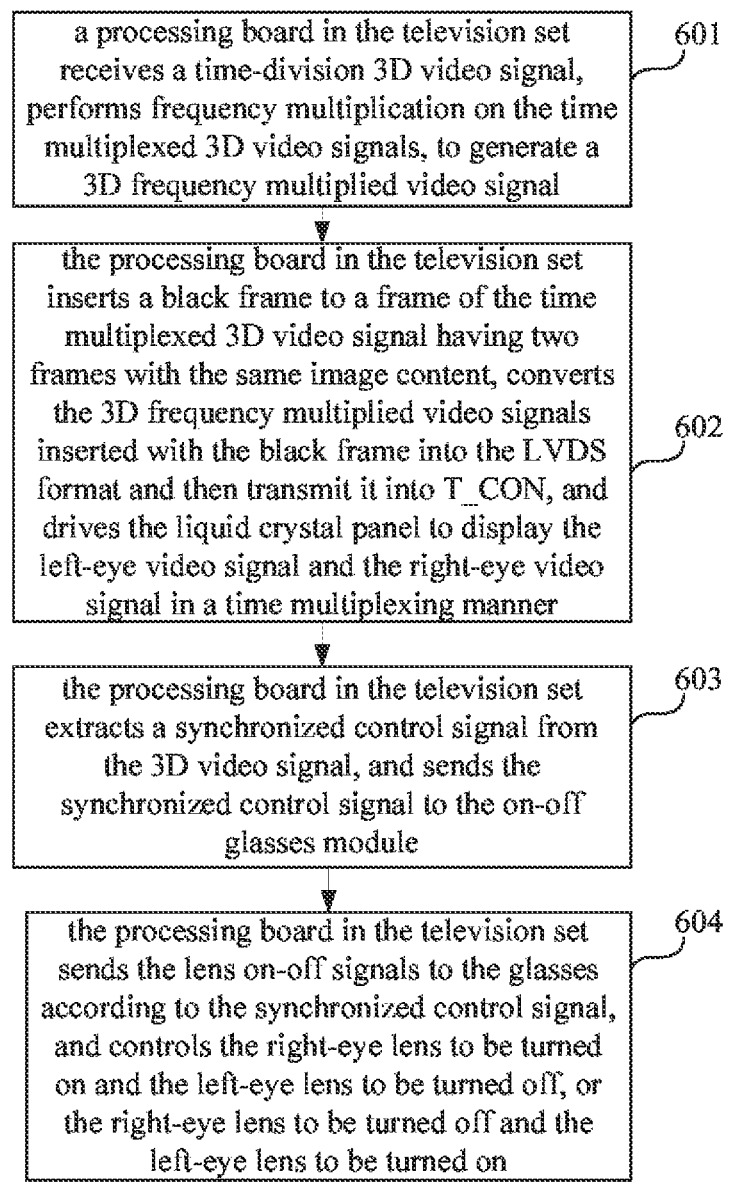
FIG. 6 illustrates a flow chart of another method for 3D display according to an embodiment of the present invention.

Referring to FIG. 6, which illustrates a flow chart of another method for 3D display according to an embodiment of the present invention, the flow chart specifically includes the following steps.

Step 601, the processing board in the television set processes the received video signals into a time multiplexed 3d video signal, inserts a black frame to the time multiplexed 3d video signal, and generates the 3D frequency multiplied video signals including the black frame;

That is, the 3D frequency multiplied video signal in this case can be represented as "the black frame+the left-eye signal+the black frame+the right-eye signal".

The time multiplexed 3d video signal includes a left-eye video signal and a right-eye video signal.

Step 602, the processing board in the television set converts the 3D frequency multiplied video signal including the black frame into a low-voltage differential signaling format and then transmits it into the liquid crystal panel driving board, and drives the liquid crystal panel to display the left-eye video signal and the right-eye video signal alternately.

Step 603, the processing board in the television set extracts the synchronized control signal from the 3d video signals, and sends the synchronized control signal to the glasses on/off module.

Step 604, the glasses on/off module sends the lens on/off signal to the glasses according to the synchronized control signal, and controls the right-eye lens to be turned on and the left-eye lens to be turned off, or the right-eye lens to be turned off and the left-eye lens to be turned on.

When the right-eye lens is controlled to be turned on and the left-eye lens is controlled to be turned off, the liquid crystal panel is driven to display a frame of black frame and a frame of right-eye video signal; and when the right-eye lens is controlled to be turned off and the left-eye lens is controlled to be turned on, the liquid crystal panel is driven to display a frame of black frame and a frame of same left-eye video signal.

It is noted that the glasses on/off module may send, according to the synchronized control signal, a lens on/off signal to the glasses via infrared, radio frequency, Bluetooth or the like.

The second embodiment will be described again hereinafter from the time sequence perspective.

Figure 7:
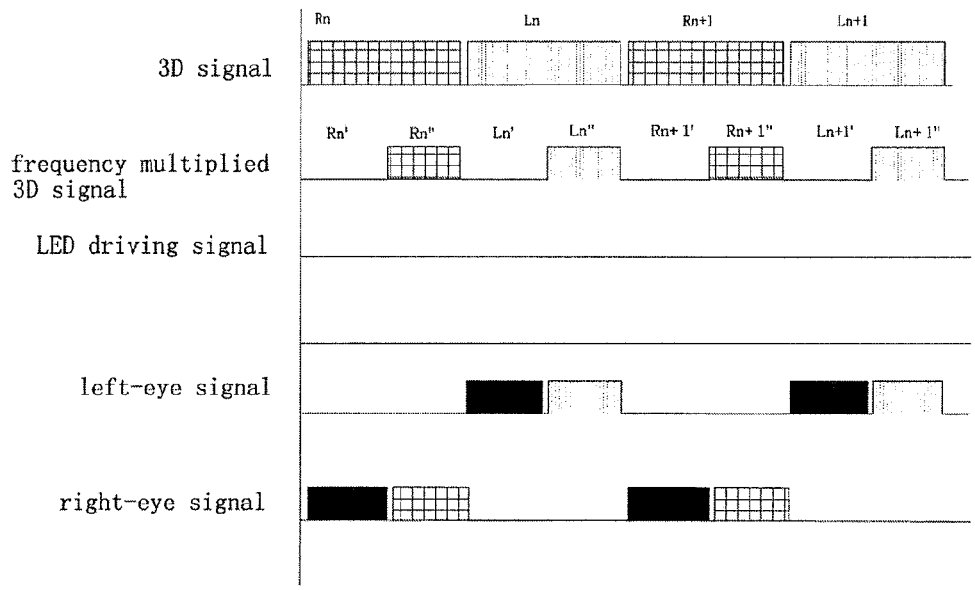
FIG. 7 illustrates a timing diagram of a time multiplexed 3d video signal, an LED driving signal and left-eye and right-eye signals according to a second embodiment of the present invention.

Reference is made to FIG. 7, which illustrates a timing diagram of a time multiplexed 3d video signal, an LED driving signal and left-eye and right-eye signals according to a second embodiment of the present invention In FIG. 7, L and R represent the left-eye video signal and the right-eye video signal respectively.

The frequency multiplied 3d video signal (e.g., the Rn", the Rn', the Ln", and the Ln') as shown in FIG. 7 is formed by inserting the black frame and frequency multiplication on time multiplexed 3d video signal (e.g., the Rn and the Ln), thus the Ln" and the Ln have the same content, the Ln' is the black frame; the (Ln+1)" and the Ln+1 have the same content, the (Ln+1)' is the black frame; the Rn" and the Rn have the same content, the Rn' is the black frame; and the (Rn+1)" and the Rn+1' have the same content, the (Rn+1)' is the black frame. In this embodiment, the LED driving signal is not processed, i.e., the LED backlight keeps on. The Rn"th, the Ln"th, the (Rn+1)"th, and the (Ln+1)"th frames of the video signal have 3d video contents, and the Rn'th, the Ln'th, the (Rn+1)'th, and the (Ln+1)'th frames of the video signal is the black frame, i.e., no content. Therefore in the signals received by the left eye, the preceding part is the image content, and the latter part has no content because it is the black frame. The case with the signal received by the right eye is similar.

As compared with the prior art, the method for 3D display provided by the second embodiment of the present invention may bring at least the following advantages.

In one aspect, the problem of crosstalk between the left-eye image and the right-eye image is solved. Persistence of the last image in the current image due to the displaying mechanism of LCDs is unacceptable for 3D display, because the resulting crosstalk between the left-eye image and the right-eye image can significantly degrade the perception of 3D, or even make it impossible. The embodiments of the present invention can solve this problem. A black burst is inserted to the frame with crosstalk, so that the frame still exists but has no content and is completely black, thereby eliminating the crosstalk.

In another aspect, the overall cost is low. As compared with other 3D display solutions, the embodiments of the present invention do not require expensive optical screens or optical retarders, thus simplifying the technology and largely lowering the overall cost.

Third Embodiment

Controlling LED Backlight Signal Based on the Second Embodiment

This embodiment is an advanced controlled version of the second embodiment. Specifically, in addition to the method shown in FIG. 6, the following steps are included: sending, by the processing board in the television set, the extracted synchronized control signal to the LED backlight driving control module; and controlling, by the LED backlight driving control module according to the synchronized control signal, the LED driving signal corresponding to the frame in which the black frame exists to be off. Thus, both the black frame and the LED backlight control are included.

Figure 8:
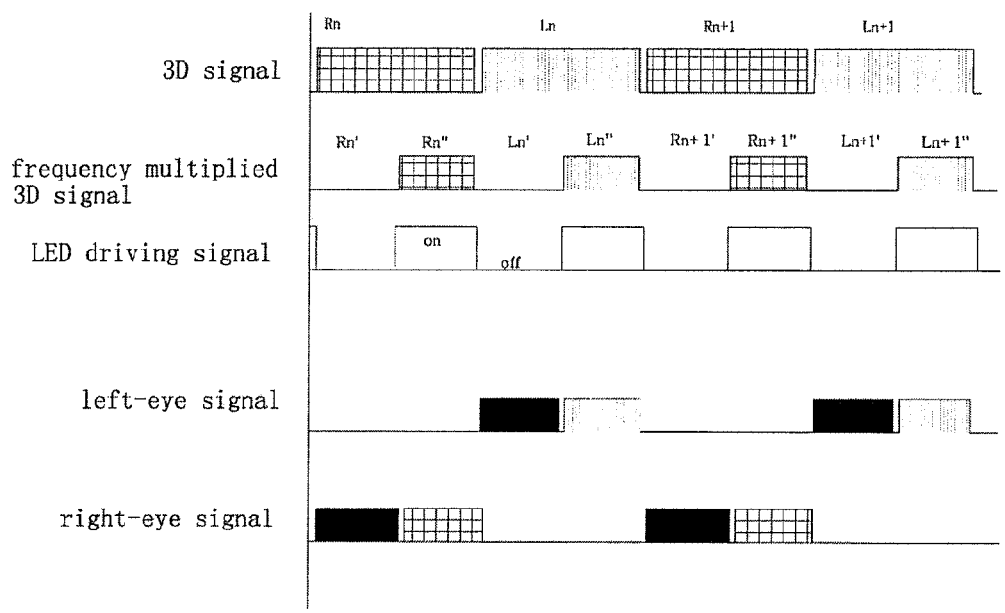
FIG. 8 illustrates a timing diagram of a time multiplexed 3d video signal, an LED driving signal and left-eye and right-eye signals according to a third embodiment of the present invention.

Reference is made to FIG. 8, which illustrates a timing diagram of a time multiplexed 3d video signal, an LED driving signal and left-eye and right-eye signals according to a third embodiment of the present invention. As compared with FIG. 7, the LED driving signal is on in the Rn"th, the Ln"th, the (Rn+1)"th, and the (Ln+1)"th frames, and is off in the Rn'th, the Ln'th, the (Rn+1)'th, and the (Ln+1)'th frames. In the signal received by the left eye, the proceeding part is the image content, and due to the black frame, the latter part is dark because the LED is off. The case with the signal received by the right eye is similar.

As compared with the prior art, the method for 3D display provided by the third embodiment of the present invention may bring at least the following advantages.

In one aspect, the problem of crosstalk between the left-eye image and the right-eye image is solved. Persistence of the last image in the current image due to the displaying mechanism of LCDs is unacceptable for 3D display, because the resulting crosstalk between the left-eye image and the right-eye image can significantly degrade the perception of 3D, or even make it impossible. The embodiments of the present invention can solve this problem. When the frame with crosstalk is displayed, which does have a content, yet nothing is shown except a black frame because the backlight is off; hence, the crosstalk is eliminated.

In another aspect, power consumption of the backlight source is reduced. According to an embodiment of the present invention, power consumption is nearly zero during the off period of the LED source. The LED control signal has a duty cycle of 50%, reducing the power consumption by nearly 50%.

In yet another aspect, the overall cost is low. As compared with other 3D display solutions, the embodiments of the present invention do not require expensive optical screens or optical retarders, thus simplifying the technology and largely lowering the overall cost.

Fourth Embodiment

Figure 9:
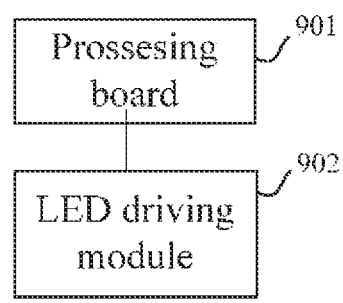
FIG. 9 illustrates a schematic diagram of a logic structure of a television set for 3D display according to an embodiment of the present invention.

The embodiment of the present invention provides a television set for 3D display, referring to FIG. 9, and the television set includes:

a processing board 901, adapted to receive a 3d video signal, the 3d video signal including a frame of a left-eye signal and a frame of a right-eye signal that are consecutive; and perform frequency multiplication on the 3d video signal, to obtain n consecutive frames of the left-eye signal and n consecutive frames of the right-eye signal, with n being the number by which a frequency is multiplied and equal to or greater than 2; and an LED driving module 902, adapted to send LED driving signals for driving a panel to display the n consecutive frames of the left-eye signal and the n consecutive frames of the right-eye signal, wherein among the n consecutive frames of the left-eye signal, the first frame of the left-eye signal corresponds to an LED driving signal which is off, and the nth frame of the left-eye signal corresponds to an LED driving signal which is on; and, among the n consecutive frames of the right-eye signal, the first frame of the right-eye signal corresponds to an LED driving signal which is off, and the nth frame of the right-eye signal corresponds to an LED driving signal which is on.

Among the n consecutive frames of the left-eye signal, the second to the (n−1)th frames of the left-eye signal correspond to LED driving signals which are on or off; and, among the n consecutive frames of the right-eye signal, the second to the (n−1)th frames of the right-eye signal correspond to LED driving signals which are on or off.

The processing board may further be adapted to extract a synchronized control signal from the 3d video signal and send the synchronized control signal to a liquid crystal panel driving board and a glasses on/off module. The LED driving module may further be adapted to control the LED driving signals according to the synchronized control signal. The glasses on/off module may further be adapted to send a lens on/off signal to glasses for viewing the 3d video signal according to the synchronized control signal, which controls a right-eye lens to be turned on and a left-eye lens to be turned off, or controls the right-eye lens to be turned off and the left-eye lens to be turned on.

When the right-eye lens is controlled to be turned on and the left-eye lens is controlled to be turned off, the LED driving signals drive a panel to display the n consecutive frames of the right-eye video signal; and, when the right-eye lens is controlled to be turned off and the left-eye lens is controlled to be turned on, the LED driving signals drive the panel to display the n consecutive frames of the left-eye video signal.

The sending the lens on/off signal to the glasses may be implemented via infrared, radio frequency or Bluetooth.

As compared with the prior art, the method for 3D display provided by the fourth embodiment of the present invention may bring at least the following advantages.

In one aspect, the problem of crosstalk between the left-eye image and the right-eye image is solved. Persistence of the last image in the current image due to the displaying mechanism of LCDs is unacceptable for 3D display, because the resulting crosstalk between the left-eye image and the right-eye image can significantly degrade the perception of 3D, or even make it impossible. The embodiments of the present invention can solve this problem. When the frame with crosstalk is displayed, which does have a content, yet nothing is shown except a black frame because the backlight is off; hence, the crosstalk is eliminated.

In another aspect, power consumption of the backlight source is reduced. According to an embodiment of the present invention, power consumption is nearly zero during the off period of the LED source. The LED control signal has a duty cycle of 50%, reducing the power consumption by nearly 50%.

In yet another aspect, the overall cost is low. As compared with other 3D display solutions, the embodiments of the present invention do not require expensive optical screens or optical retarders, thus simplifying the technology and largely lowering the overall cost.

Fifth Embodiment

The embodiment of the present invention provides another television set for 3D display, also referring to FIG. 9, and the television set includes:

a processing board 901, adapted to receive a 3d video signal, the 3d video signal including a frame of a left-eye signal and a frame of a right-eye signal; insert a black frame to the 3d video signal, and perform frequency multiplication on the 3d video signal, to generate n consecutive frames of the left-eye signal and n consecutive frames of the right-eye signal including the black frame, with n being the number by which a frequency is multiplied and equal to or greater than 2, wherein among the n consecutive frames of the left-eye signal, the first frame of the left-eye signal is a black frame, and the nth frame of the left-eye signal is a non-black frame; and, among the n consecutive frames of the right-eye signal, the first frame of the right-eye signal is a black frame, and the nth frame of the right-eye signal is a non-black frame; and an LED driving module 902, adapted to send LED driving signals for driving a display to display the n consecutive frames of the left-eye signal and the n consecutive frames of the right-eye signal.

Among the n consecutive frames of the left-eye signal, the second to the (n−1)th frames of the left-eye signal correspond to black frames or non-black frames; and, among the n consecutive frames of the right-eye signal, the second to the (n−1)th frames of the right-eye signal correspond to black frames or non-black frames.

The processing board is further adapted to extract a synchronized control signal from the 3d video signal; and send the synchronized control signal to a liquid crystal panel driving board and a glasses on/off module;

the LED driving module is further adapted to control the LED driving signals according to the synchronized control signal; and the glasses on/off module is further adapted to send a lens on/off signal to glasses for viewing the 3d video signals according to the synchronized control signal, which controls a right-eye lens to be turned on and a left-eye lens to be turned off, or controls the right-eye lens to be turned off and the left-eye lens to be turned on.

When the right-eye lens is controlled to be turned on and the left-eye lens is controlled to be turned off, the LED driving signals drive a panel to display the n consecutive frames of the right-eye video signal; and, when the right-eye lens is controlled to be turned off and the left-eye lens is controlled to be turned on, the LED driving signals drive the panel to display the n consecutive frames of the left-eye video signal.

The LED driving module is further adapted to, according to the synchronized control signal, control LED driving signals corresponding to the black frames among the n consecutive frames of the left-eye signal to be off, and LED driving signals corresponding to the non-black frames to be on; and control LED driving signals corresponding to the black frames among the n consecutive frames of the right-eye signal to be off, and LED driving signals corresponding to the non-black frames to be on.

The lens on/off signal may be sent to the glasses via infrared, radio frequency or Bluetooth.

As compared with the prior art, the television set for 3D display provided by the fifth embodiment of the present invention may bring at least the following advantages.

In one aspect, the problem of crosstalk between the left-eye image and the right-eye image is solved. Persistence of the last image in the current image due to the displaying mechanism of LCDs is unacceptable for 3D display, because the resulting crosstalk between the left-eye image and the right-eye image can significantly degrade the perception of 3D, or even make it impossible. The embodiments of the present invention can solve this problem. A black burst is inserted to the frame with crosstalk, so that the frame still exists but has no content and is completely black, thereby eliminating the crosstalk.

In another aspect, power consumption of the backlight source is reduced. According to an embodiment of the present invention, power consumption is nearly zero during the off period of the LED source. The LED control signal has a duty cycle of 50%, reducing the power consumption by nearly 50%.

In yet another aspect, the overall cost is low. As compared with other 3D display solutions, the embodiments of the present invention do not require expensive optical screens or optical retarders, thus simplifying the technology and largely lowering the overall cost.

It is noted that in the first embodiment to the fifth embodiment described above, the LED driving signal is a low-voltage direct current signal, which has a short response time and may eliminate the trailing in liquid crystal display. Furthermore, the LED driving signal can achieve complete cut-off of the backlight, resolving the drawback that the "black screen" on the liquid crystal display is not black enough. Different from some display driving signals such as that of the cold cathode fluorescent lamp (CCFL), which has a delay in its powering on and off and has energy loss in the square waveform, LEDs have better applicability due to their rapid powering on and off and intact square waveforms. Furthermore, LEDs have a wider and brighter color range.

Sixth Embodiment

Figure 10:
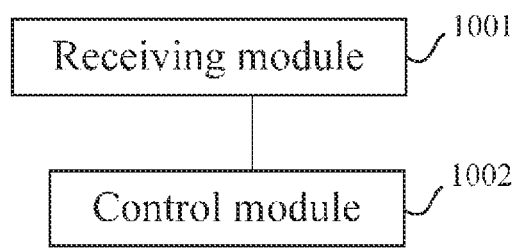
FIG. 10 illustrates a schematic diagram of a logic structure of another television set for 3D display according to an embodiment of the present invention.

The embodiment of the present invention provides glasses for viewing a 3d video, referring to FIG. 10, and the glasses include:

a receiving module 1001, adapted to receive a lens on/off signal and transmit the lens on/off signal to a controlling module; and a controlling module 1002, adapted to, according to the received lens on/off signal, control a right-eye lens to be turned on and a left-eye lens to be turned off, or control the right-eye lens to be turned off and the left-eye lens to be turned on.

The glasses are used in conjunction with the television set according to the fifth embodiment and the sixth embodiment above, for viewing a 3d video.

As for the embodiments of the television set and the glasses, the descriptions are relatively simple because of their similarity to the embodiments of the method. For more information on the relating parts, please refer to the method embodiments.

It is noted that the terms "include", "comprise", or any other variation used herein are inclusive, do not exclude additional, unrecited elements of a process, method, product or device, and do not exclude inherent elements of the process, method, product or device. Moreover, if no more restrictions are binding, the wording such as "including an element" does not exclude the case where two or more of the elements are present in a process, method, product or device.

Preferred embodiments of the present invention are described above, which should not be interpreted as limiting the scope of the present invention. Any modifications, equivalents, and improvements without deviation from the spirit and the principle of the present invention shall fall within the scope of the present invention.

The invention claimed is:

1. A method for displaying a 3d video, comprising:
   receiving a 3d video signal, the 3d video signal comprising a frame of a left-eye signal and a frame of a right-eye signal that are consecutive;
   performing frequency multiplication on the received 3d video signal by generating n consecutive frames of the left-eye signal in a first time duration occupied by one frame of the left-eye signal comprised in the received 3d video signal and generating n consecutive frames of the right-eye signal in a second time duration, subsequent to the first time duration, occupied by one frame of the right-eye signal comprised in the received 3d video signal, with n being greater than 2, wherein, each frame of n consecutive frames of the left-eye signal has the same video content and each frame of n consecutive frames of the right-eye signal has the same video content; and
   driving, by light-emitting diode (LED) driving signals, a panel to display the n consecutive frames of the left-eye signal and the n consecutive frames of the right-eye signal,
   wherein among the n consecutive frames of the left-eye signal, the first frame of the left-eye signal corresponds to an LED driving signal which is off, and the nth frame of the left-eye signal corresponds to an LED driving signal which is on; and, among the n consecutive frames of the right-eye signal, the first frame of the right-eye signal corresponds to an LED driving signal which is off, and the nth frame of the right-eye signal corresponds to an LED driving signal which is on,
   wherein, among the n consecutive frames of the left-eye signal, the second to the (n−1)th frames of the left-eye signal correspond to LED driving signals which are on or off; and, among the n consecutive frames of the right-eye signal, the second to the (n−1)th frames of the right-eye signal correspond to LED driving signals which are on or off.

2. The method according to claim 1, wherein, the method further comprises: extracting a synchronized control signal from the 3d video signal; and, according to the synchronized control signal, controlling the LED driving signals and sending a lens on/off signal to glasses for viewing the 3d video signal, which controls a right-eye lens to be turned on and a left-eye lens to be turned off, or controls the right-eye lens to be turned off and the left-eye lens to be turned on,
   wherein when the right-eye lens is controlled to be turned on and the left-eye lens is controlled to be turned off, the LED driving signals drive a panel to display the n consecutive frames of the right-eye video signal; and, when the right-eye lens is controlled to be turned off and the left-eye lens is controlled to be turned on, the LED driving signals drive the panel to display the n consecutive frames of the left-eye video signal.

3. A method for displaying a 3d video, comprising:
   receiving a 3d video signals, the 3d video signal comprising a frame of a left-eye signal and a frame of a right-eye signal;
   performing frequency multiplication on the received 3d video signal by generating n consecutive frames of the left-eye signal in a first time duration occupied by one frame of the left-eye signal comprised in the received 3d video signal and generating n consecutive frames of the right-eye signal in a second time duration, subsequent to the first time duration, occupied by one frame of the right-eye signal comprised in the received 3d video signal with n being greater than 2,
   wherein, at least one frame of the n consecutive frames of the left-eye signal is a black frame and at least one frame of the n consecutive frames of the right-eye signal is a black frame, each non-black frame of n consecutive frames of the left-eye signal has the same video content and each non-black frame of n consecutive frames of the right-eye signal has the same video content;
   wherein among the n consecutive frames of the left-eye signal, the first frame of the left-eye signal is a black frame, and the nth frame of the left-eye signal is a non-black frame; and, among the n consecutive frames of the right-eye signal, the first frame of the right-eye signal is a black frame, and the nth frame of the right-eye signal is a non-black frame; and
   driving, by light-emitting diode (LED) driving signals, a panel to display the n consecutive frames of the left-eye signal and the n consecutive frames of the right-eye signal,
   wherein, among the n consecutive frames of the left-eye signal, the second to the (n−1)th frames of the left-eye signal correspond to LED driving signals which are on or off; and, among the n consecutive frames of the right-eye signal, the second to the (n−1)th frames of the right-eye signal correspond to LED driving signals which are on or off.

4. The method according to claim 3, wherein, the method further comprises: extracting a synchronized control signal from the 3d video signal; and, according to the synchronized control signal, controlling the LED driving signals and sending a lens on/off signal to glasses for viewing the 3d video signal, which controls a right-eye lens to be turned on and a left-eye lens to be turned off, or controls the right-eye lens to be turned off and the left-eye lens to be turned on,
   wherein when the right-eye lens is controlled to be turned on and the left-eye lens is controlled to be turned off, the LED driving signals drive a panel to display the n consecutive frames of the right-eye video signal; and, when the right-eye lens is controlled to be turned off and the left-eye lens is controlled to be turned on, the LED driving signals drive the panel to display the n consecutive frames of the left-eye video signal.

5. The method according to claim 4, wherein, the method further comprises:
   according to the synchronized control signal, controlling LED driving signals corresponding to the black frames among the n consecutive frames of the left-eye signal to be off, and LED driving signals corresponding to the non-black frames to be on; and controlling LED driving signals corresponding to the black frames among the n consecutive frames of the right-eye signal to be off, and LED driving signals corresponding to the non-black frames to be on.

6. A television set for displaying a 3d video, comprising:
a processing board, adapted to receive a 3d video signal, the 3d video signal comprising a frame of a left-eye signal and a frame of a right-eye signal that are consecutive; and perform frequency multiplication on the received 3d video signal by generating n consecutive frames of the left-eye signal in a first time duration occupied by one frame of the left-eye signal comprised in the received 3d video signal and generating n consecutive frames of the right-eye signal in a second time duration, subsequent to the first time duration, occupied by one frame of the right-eye signal comprised in the received 3d video signal, with n being greater than 2, wherein, each frame of n consecutive frames of the left-eye signal has the same video content and each frame of n consecutive frames of the right-eye signal has the same video content; and
an LED driving module, adapted to send LED driving signals for driving a panel to display the n consecutive frames of the left-eye signal and the n consecutive frames of the right-eye signal,
wherein among the n consecutive frames of the left-eye signal, the first frame of the left-eye signal corresponds to an LED driving signal which is off, and the nth frame of the left-eye signal corresponds to an LED driving signal which is on; and, among the n consecutive frames of the right-eye signal, the first frame of the right-eye signal corresponds to an LED driving signal which is off, and the nth frame of the right-eye signal corresponds to an LED driving signal which is on,
wherein, among the n consecutive frames of the left-eye signal, the second to the (n−1)th frames of the left-eye signal correspond to LED driving signals which are on or off; and, among the n consecutive frames of the right-eye signal, the second to the (n−1)th frames of the right-eye signal correspond to LED driving signals which are on or off.

7. The television set d according to claim 6, wherein, the processing board is further adapted to extract a synchronized control signal from the 3d video signal and send the synchronized control signal to a liquid crystal panel driving board and a glasses on/off module;
the LED driving module is further adapted to control the LED driving signals according to the synchronized control signal; and
the glasses on/off module is further adapted to send a lens on/off signal to glasses for viewing the 3d video signal according to the synchronized control signal, which controls a right-eye lens to be turned on and a left-eye lens to be turned off, or controls the right-eye lens to be turned off and the left-eye lens to be turned on,
wherein when the right-eye lens is controlled to be turned on and the left-eye lens is controlled to be turned off, the LED driving signals drive a panel to display the n consecutive frames of the right-eye video signal; and, when the right-eye lens is controlled to be turned off and the left-eye lens is controlled to be turned on, the LED driving signals drive the panel to display the n consecutive frames of the left-eye video signal.

8. A television set for displaying a 3d video, comprising:
a processing board, adapted to receive a 3d video signal, the 3d video signal comprising a frame of a left-eye signal and a frame of a right-eye signal; perform frequency multiplication on the received 3d video signal by generating n consecutive frames of the left-eye signal in a first time duration occupied by one frame of the left-eye signal comprised in the received 3d video signal and generating n consecutive frames of the right-eye signal in a second time duration, subsequent to the first time duration, occupied by one frame of the right-eye signal comprised in the received 3d video signal, with n being greater than 2; wherein, at least one frame of the n consecutive frames of the left-eye signal is a black frame and at least one frame of the n consecutive frames of the right-eye signal is a black frame, each non-black frame of n consecutive frames of the left-eye signal has the same video content and each non-black frame of n consecutive frames of the right-eye signal has the same video content, wherein among the n consecutive frames of the left-eye signal, the first frame of the left-eye signal is a black frame, and the nth frame of the left-eye signal is a non-black frame; and, among the n consecutive frames of the right-eye signal, the first frame of the right-eye signal is a black frame, and the nth frame of the right-eye signal is a non-black frame; and
an LED driving module, adapted to send LED driving signals for driving a panel to display the n consecutive frames of the left-eye signal and the n consecutive frames of the right-eye signal,
wherein, among the n consecutive frames of the left-eye signal, the second to the (n−1)th frames of the left-eye signal correspond to LED driving signals which are on or off; and, among the n consecutive frames of the right-eye signal, the second to the (n−1)th frames of the right-eye signal correspond to LED driving signals which are on or off.

9. The television set according to claim 8, wherein, the processing board is further adapted to extract a synchronized control signal from the 3d video signal; and send the synchronized control signal to a liquid crystal panel driving board and a glasses on/off module;
the LED driving module is further adapted to control the LED driving signals according to the synchronized control signal; and
the glasses on/off module is further adapted to send a lens on/off signal to glasses for viewing the 3d video signals according to the synchronized control signal, which controls a right-eye lens to be turned on and a left-eye lens to be turned off, or controls the right-eye lens to be turned off and the left-eye lens to be turned on,
wherein when the right-eye lens is controlled to be turned on and the left-eye lens is controlled to be turned off, the LED driving signals drive a panel to display the n consecutive frames of the right-eye video signal; and, when the right-eye lens is controlled to be turned off and the left-eye lens is controlled to be turned on, the LED driving signals drive a panel to display the n consecutive frames of the left-eye video signal.

10. The television set according to claim 9, wherein, the LED driving module is further adapted to, according to the synchronized control signal, control LED driving signals corresponding to the black frames among the n consecutive frames of the left-eye signal to be off, and LED driving signals corresponding to the non-black frames to be on; and control LED driving signals corresponding to the black frames among the n consecutive frames of the right-eye signal to be off, and LED driving signals corresponding to the non-black frames to be on.

* * * * *